Patented Sept. 8, 1936

2,053,289

UNITED STATES PATENT OFFICE 2,053,289

CELLULOSE DERIVATIVE COMPOSITIONS

Emmette F. Izard, Elsmere, Del., assignor to E. I. du Pont de Nemours & Company, Wilmington, Del., a corporation of Delaware No Drawing. Application August 30, 1932, Serial No. 631,100

17 Claims. (Cl. 106—40)

This invention relates to cellulose derivative compositions and, more particularly, to compositions comprising a cellulose derivative and, as a plasticizer therefor, a dicarboxylic acid ester of a monohydric ether alcohol. This application is a continuation in part of applicant's copending application Serial No. 550,286, filed July 11, 1931, in which the general class of esters herein used as plasticizers, as well as the preparation of such esters, is disclosed and claimed. The present invention is broader than that disclosed in application Serial No. 550,286 in including the "methoxy" alcohol esters as plasticizers for cellulose derivatives.

An object of the present invention is to provide new cellulose derivative compositions having advantageous properties. A further object is to provide cellulose derivative compositions adapted for use in the coating and plastic arts and to provide compositions having improved water resistance and durability. Other objects of the invention will be apparent from the description given hereinafter.

The above objects are accomplished according to the present invention by employing as a plasticizer of a cellulose derivative an ester of an aliphatic dicarboxylic acid containing from 6–10 carbon atoms, inclusive, wherein the hydrogen atom of at least one carboxyl group is replaced by a group of atoms represented by the formula R. O. R'—, in which R represents the radical of a monohydric alcohol and R' represents a radical from the group consisting of divalent aliphatic hydrocarbon radicals and divalent aliphatic hydrocarbon radicals having an alkoxy group substituted for at least one hydrogen atom thereof. One or more hydrogens of the alkoxy group may be replaced by an aryl group. By "alkoxy group" therefore are included aralkyl ethers as well as alkyl ethers.

The esters herein used as plasticizers for cellulose derivatives may be prepared by reacting a saturated or unsaturated dicarboxylic acid containing from 6–10 carbon atoms, inclusive, with a monohydric ether alcohol in the presence of a catalyst at an elevated temperature and removing the water formed by said reaction from the reaction zone. Alternatively, the esters may be prepared by reacting an ester of an acid of the group specified with a monohydric ether alcohol having a higher boiling point than the alcohol formed upon hydrolysis of the ester used as a starting material.

The use of a catalyst is not essential, although it is preferred. Sulphuric acid, metallic sodium, hydrogen chloride gas, or phenolsulphonic acid, and the like, may be used as catalysts in the reaction. The temperature may be varied widely but it is preferred to keep it between 80–200° C. If desired, an inert high boiling solvent, such as toluol, may be used in the reaction mixture to facilitate the removal of the water formed during the reaction, or the alcohol formed during the reaction where an ester is used as the starting material.

The following examples are given to illustrate the preparation of esters employed as plasticizers in the present invention:

*Example 1—Di-ethoxyethyl adipate.*—A mixture of 1800 grams of adipic acid, 2500 grams of ethoxyethanol, 1000 grams of toluol, and 45 grams of sulphuric acid was heated to boiling in an apparatus designed to separate the water from the distillate and return the organic solvent to the reaction vessel. After 6 hours' heating, it was found that approximately 95% of the adipic acid had been esterified. The product was treated with potassium carbonate to remove the excess acid and then purified by vacuum distillation. Di-ethoxyethyl adipate distills between 200–220° C. at 10 mm. pressure.

By the use of methyladipic acid in place of adipic acid, the corresponding esters of methyladipic acid may be obtained in the manner above described. By reacting butoxyethanol with methyladipic acid, the dibutoxyethyl ester of methyladipic acid is obtained.

*Example 2—Di-diethylin sebacate.*—A mixture containing 202 grams sebacic acid, 306 grams diethylin, 100 grams toluol, and 4 grams sulphuric acid was heated to boiling in an apparatus such as used in Example 1. Esterification was practically complete in 3 hours. The product was then purified as in Example 1. Di-diethylin sebacate distills between 260–265° C. at 2 mm. pressure.

*Example 3—Butoxyethyl ethyl sebacate.*—118 parts of butoxyethanol containing 0.5 part of dissolved sodium was added to 258 parts diethyl sebacate. The mixture was heated to boiling under a fractionating column until 42 parts of ethanol had distilled out. The product was washed with water, and then purified by heating to 180° C. at 15 mm. pressure in the presence of decolorizing carbon. The filtered product was an amber colored liquid.

The above example illustrates the preparation of these esters using an ester of a dicarboxylic acid as the starting material. Any other simple ester of a dicarboxylic acid could be substituted for the ethyl ester in the above example. Likewise, any other ether alcohol can be substituted for the butoxyethanol, provided the alcohol has a higher boiling point than the alcohol formed upon hydrolysis of the dicarboxylic acid ester used as the starting material.

*Example 4—Di-ethoxyethoxyethyl adipate.—* A mixture containing 150 grams of adipic acid and 325 grams of ethoxyethoxyethanol was heated to boiling for 8 hours while passing a slow stream of dry hydrogen chloride gas through the reaction mixture. The product was washed with alkali to remove the unreacted acid and then vacuum distilled. Di-ethoxyethoxyethyl adipate distills between 250–300° C. at 6 mm. pressure.

*Example 5—Di-butoxyethyl sebacate.—* A mixture containing 202 grams sebacic acid, 350 grams butoxyethanol, 100 grams toluol and 4 grams sulfuric acid was heated to boiling in an apparatus such as used in Example 1. Esterification was practically complete in three hours. The product was purified as in Example 1. Butoxyethyl sebacate distills between 240–250° C. at 2 mm. pressure.

The esters used as plasticizers in the cellulose derivative compositions of the present invention include the esters of the saturated aliphatic dicarboxylic acids having from 6–10 carbon atoms, inclusive, such as adipic, methyladipic, dimethyladipic, pimelic, suberic, azelaic, and sebacic acids, and the esters of the unsaturated aliphatic dicarboxylic acids having from 6–10 carbon atoms, inclusive, such as dihydromuconic, muconic, diacetylenedicarboxylic, dipropargyldicarboxylic, piperylenedicarboxylic, xeronic, and tetraacetylenedicarboxylic acids. With some of those containing triple bonds care must be exercised in the preparation due to the instability of the free acids. Halogenated acids, particularly chlorinated acids, may be used. These acids may be esterified with a monohydric alcohol represented by the formula R.O.R'.OH, in which R represents a monovalent organic radical and R' represents a divalent organic radical. Esters formed from the ether alcohols represented by the formula R.O.CH$_2$CH$_2$OH, i. e., the ether ethanols, are particularly valuable. Besides the monohydric ether alcohols disclosed in the specific examples, butoxyethoxyethanol, benzyloxyethanol, cyclohexyloxyethanol, dodecyloxyethanol, tetrahydrofurfuryloxyethanol, dibutylin, dimethylin, dibenzylin, methoxyethanol, and methoxyethoxyethanol may be used advantageously to esterify the dicarboxylic acid.

The dicarboxylic acid may be completely or partially esterified, or may have the hydrogen atom of one carboxyl group esterified with an ether alcohol and the other with any other monovalent organic radical, i. e., phenyl, benzyl, naphthyl, methyl, ethyl, butyl, dodecyl, cinnamyl, allyl, crotyl, cyclohexyl, tetrahydrofurfuryl, et cetera. The plasticizers included within the scope of the present invention therefore comprise the half esters or acid esters, the mixed esters in which the hydrogen atom of at least one carboxyl group is esterified with an ether alcohol, and the neutral esters in which the hydrogen atom of each carboxyl group is esterified with an ether alcohol.

The herein described esters are all either water white liquids or white solids when in the pure state, although they may be amber colored when impurities are present. They are practically insoluble in water but are readily soluble in the ordinary lacquer solvents, such as alcohols, ketones, esters, and hydrocarbons. They are compatible in equal proportions with nitrocellulose and in somewhat lower proportions with other cellulose esters and cellulose ethers. In plastic compositions, the esters may be used in amounts up to 100%, or more, by weight of the cellulose derivative employed. Films of cellulose derivative compositions containing the neutral esters herein described are extremely tough and flexible and have excellent water resistance. Due to the extremely high boiling point possessed by these esters, they impart substantially permanent flexibility to the films in which they are used. The dimethoxyethyl ester of adipic acid is particularly advantageous for use as a plasticizer in cellulose acetate compositions.

The following examples illustrate typical coating compositions containing these esters as plasticizers:

*Example 6*

|  | Parts |
|---|---|
| Cellulose nitrate | 12.0 |
| Pigment | 16.3 |
| Damar | 3.5 |
| Castor oil | 2.6 |
| Di-diethylin adipate | 4.0 |
| Solvent | 161.6 |

*Example 7*

|  | Parts |
|---|---|
| Cellulose acetate | 12.0 |
| Di-etryoxyethyl adipate | 6.0 |
| Solvent | 182.0 |

*Example 8*

|  | Parts |
|---|---|
| Ethyl cellulose | 4.0 |
| Ethoxyethyl ethyl adipate | 1.0 |
| Solvent | 24.0 |

*Example 9*

|  | Parts |
|---|---|
| Cellulose nitrate | 10.0 |
| Di-butoxyethyl sebacate | 12.0 |
| Pigment | 10.0 |
| Solvent | 20.0 |

*Example 10*

|  | Parts |
|---|---|
| Cellulose acetate | 12.0 |
| Di-methoxyethyl adipate | 6.0 |
| Solvent | 182.0 |

*Example 11*

|  | Parts |
|---|---|
| Ethyl cellulose | 4.0 |
| Methoxyethyl ethyl adipate | 1.0 |
| Solvent | 24.0 |

In the above examples, the term "solvent" is to be understood as designating a suitable mixture of esters, alcohols, and/or hydrocarbons such as would be obvious to those skilled in the art. The above coating compositions give tough, flexible films having good water resistance and excellent durability.

The following examples illustrate typical plastic compositions containing these esters as plasticizers:

*Example 12*

|  | Parts |
|---|---|
| Cellulose acetate | 100.0 |
| Di-ethoxyethoxyethyl adipate | 40.0 |

*Example 13*

|  | Parts |
|---|---|
| Ethyl cellulose | 100.0 |
| Di-methoxyethoxyethyl adipate | 20.0 |

Example 14

| | Parts |
|---|---|
| Nitrocellulose | 100.0 |
| Di-diethylin sebacate | 50.0 |
| Filler (including color) | 200.0 |

Example 15

| | Parts |
|---|---|
| Cellulose acetate | 100.0 |
| Di-methoxyethyl adipate | 40.0 |

The above compositions may be prepared with or without the usual volatile solvents or diluents, such as alcohols for cellulose nitrate compositions, acetone for cellulose acetate compositions, and toluol-alcohol mixtures for the ether compositions. In all of the above examples the plasticizers may be replaced in part by other esters herein described, or by one or more of the heretofore known plasticizers, such as triacetin, triphenyl phosphate, dibutyl phthlate, camphor, tricresyl phosphate, and the like. Other cellulose derivatives, such as cellulose propionate, cellulose butyrate, cellulose acetobutyrate, cellulose nitroacetate, and benzyl cellulose may be used with these esters. Likewise, other resins than damar, such as ester gum, any synthetic resins such as the polyhydric alcohol polybasic acid type, may be used. Oils other than castor, e. g., Chinawood, linseed, soya bean, or cottonseed oil, may be used.

The cellulose derivative compositions herein disclosed may be used as lacquers for coating metal leather, paper, and wood, in dopes for coating fabrics, and in plastic compositions to be used in the preparation of toilet ware, novelties, sheeting, rods, tubes, photographic films, and in similar uses.

The esters herein disclosed may likewise be used as plasticizers for natural resins, such as damar, sandarac, Congo, elemi, gualac, kauri, rosin et cetera, and synthetic resins such as polyhydric alcohol-polybasic acid resins, phenol-aldehyde resins, urea-formaldehyde resins, vinyl resins, ester gums, and other resins, et cetera. They may be used alone or in conjunction with other modifiers for the resins, such as waxes, and the like.

As many apparently different embodiments of this invention may be made without departing from the spirit and scope thereof, it is to be understood that the invention is not limited to the specific embodiments thereof except as defined in the appended claims.

I claim:

1. A composition comprising a cellulose derivative and an ester of an acid from the group consisting of adipic, methyladipic, sebacic, and muconic acids, wherein the hydrogen atom of each carboxyl group of the acid has been replaced by a group of atoms represented by the formula $CH_3OCH_2CH_2-$.

2. A composition comprising a cellulose derivative and di-methoxyethyl adipate.

3. A composition comprising cellulose acetate and an ester of an aliphatic dicarboxylic acid containing from 6—10 carbon atoms, inclusive, wherein the hydrogen atom of at least one carboxyl group is replaced by a group of atoms represented by the formula $CH_3OCH_2CH_2-$, and the hydrogen atom of the remaining carboxyl group is replaced by a monovalent radical derived from an organic hydroxyl compound of the class consisting of alcohols and phenols.

4. A composition comprising cellulose acetate and di-methoxyethyl adipate.

5. A composition of matter comprising an organic derivative of cellulose and a lower BB'-dialkoxy diethyl adipate.

6. A composition of matter comprising cellulose acetate and a lower BB'-dialkoxy diethyl adipate.

7. A composition of matter comprising cellulose acetate and BB'-diethoxy diethyl adipate.

8. A cellulose ester composition including an organic ester of cellulose and bis-ethyl glycol sebacate.

9. A cellulose ester composition including an organic ester of cellulose and a diester of a monoalkyl ether of a dihydric alcohol and sebacic acid.

10. A cellulose ester composition including cellulose acetate and a diester of a monoalkyl ether of a dihydric alcohol and sebacic acid.

11. A cellulose ester composition including cellulose acetobutyrate and a diester of a monoalkyl ether of a dihydric alcohol and sebacic acid.

12. A composition of matter comprising an organic derivative of cellulose and an alkoxyethyl ester of adipic acid.

13. A composition of matter comprising an organic derivative of cellulose and an alkoxyethyl ester of an aliphatic dicarboxylic acid containing six to ten carbon atoms, inclusive.

14. A composition of matter comprising a cellulose derivative and an adipate of an alkoxyalkanol of the formula $R-O-R''-OH$ wherein R is an alkyl radical and R'' is an alkylene radical of at least two carbon atoms.

15. A composition of matter comprising a cellulose derivative and a sebacate of an alkoxyalkanol of the formula $R-O-R''-OH$ wherein R is an alkyl radical and R'' is an alkylene radical of at least two carbon atoms.

16. A composition of matter comprising cellulose acetate and bis-ethoxyethyl sebacate.

17. A composition of matter comprising a cellulose derivative and an aliphatic dicarboxylic acid of an alkoxyalkanol of the formula $R-O-R''-OH$ wherein R is an alkyl radical and R'' is an alkylene radical of at least two carbon atoms, said acid being of the class consisting of adipic, methyladipic, sebacic, and muconic acids.

EMMETTE F. IZARD.

CERTIFICATE OF CORRECTION.

Patent No. 2,053,289.　　　　　　　　　　　　　　　　September 8, 1936.

EMMETTE F. IZARD.

It is hereby certified that error appears in the printed specification of the above numbered patent requiring correction as follows: Page 2, second column, line 33, Example 7, for "Di-etryoxyethyl" read Di-ethoxyethyl; and that the said Letters Patent should be read with this correction therein that the same may conform to the record of the case in the Patent Office.

Signed and sealed this 26th day of January A. D. 1937.

Henry Van Arsdale (Seal)　　　　　　　　　　　　　　　　Acting Commissioner of Patents.